UNITED STATES PATENT OFFICE.

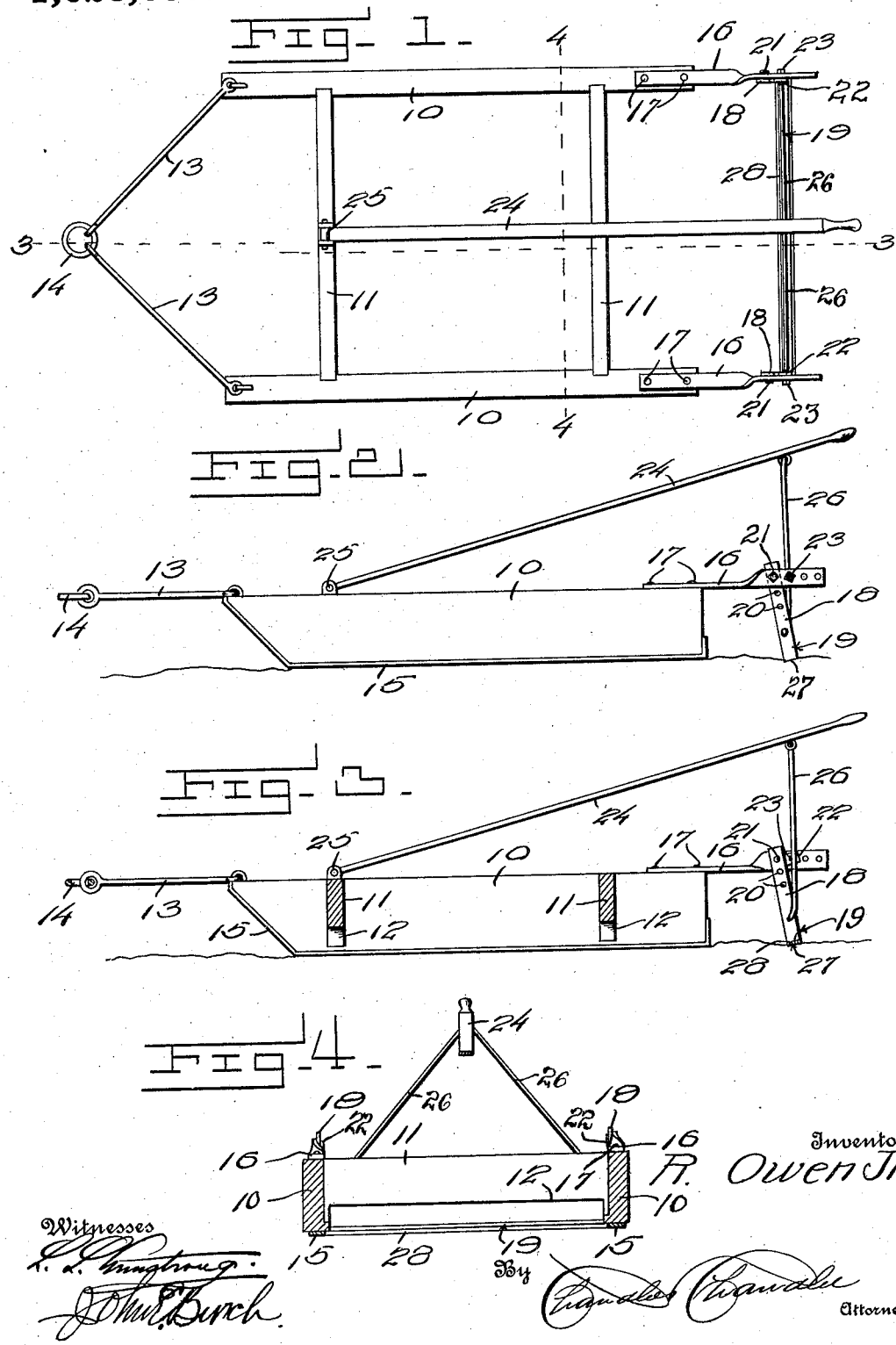

ROMAINE OWEN, JR., OF GORDON, WASHINGTON.

WEEDER.

1,028,059.  Specification of Letters Patent.  Patented May 28, 1912.

Application filed October 30, 1911. Serial No. 657,639.

*To all whom it may concern:*

Be it known that I, ROMAINE OWEN, Jr., a citizen of the United States, residing at Gordon, in the county of Douglas, State of Washington, have invented certain new and useful Improvements in Weeders; and I do hereby declare the following to be a full, clear, and exact description of the invention, such as will enable others skilled in the art to which it appertains to make and use the same.

This invention relates to a weeder and more especially to a device of this character in the form of a hand sled and provided with a novel form of pivoted and adjustable cutting blade which will serve to simultaneously cut the weeds, and pulverize and level the soil when drawn across the field.

The primary object of the invention is to provide a sled having novel means whereby the knife or blade may be angularly or vertically adjusted relative to the ground and also raised from engagement with the ground when desired that the same should not operate.

With the above and other objects in view, the invention consists of certain other combinations and arrangements of parts as will be hereinafter more fully described and claimed, it being a still further object of the invention to provide a device which will not be likely to get out of working order.

In the drawings:—Figure 1 is a top plan view of my improved weeder. Fig. 2 is a side elevation thereof. Fig. 3 is a longitudinal sectional view taken on the line 3—3 of Fig. 1. Fig. 4 is a transverse sectional view on the line 4—4 of Fig. 1.

Referring to the drawings in detail, there is shown my improved weeder which comprises the spaced longitudinal runner bars 10 formed of timber and which are connected adjacent their forward and rear ends by cross bars 11 having longitudinal notches 12 in their lower edges to permit the free passage or escape of foreign substances without clogging when the machine is drawn across a field through the medium of the draft attaching rods 13 which are connected at their rear ends to the forward ends of the runner bars and at their forward ends by a link 14 centrally of the width of the frame thus formed. Metallic runners 15 are also provided for the lower longitudinal edges of the runner bar so as to protect the bars from wear and to cause them to more easily glide over the earth.

Rearwardly projecting arms 16 are secured to the upper faces of the rear ends of the runner bars 10 and said arms each comprise short sections of strip iron which are bolted at two points to the runner bars as shown at 17 and the rear ends of said strip irons are twisted to lie in a vertical plane for the pivotal attachment of the upwardly extending end portions 18 of a weeder blade 19. The blade 19 has the ends 18 extended at right angles thereto and each end is provided with a series of vertical spaced openings 20 for receiving fastening bolts 21 whereby the blade may be vertically adjusted relative to the ground. In order to adjust the blade in angular relation to the ground or gage the slant thereof, a pair of metallic blocks 22 having a perforation therethrough located at unequal distances from all sides thereof are provided, the said perforations serving to receive clamping bolts 23 which extend through the rear ends of the arms so that the blocks may be turned for engagement with the portions 18 of the blade so as to regulate the angle of inclination of the blade while a hand operated lever 24 has its forward end pivotally connected to the forward cross bar 11 centrally between the runner bars as shown at 25 and extends rearwardly over the blade whereby the blade may be raised or lowered upon its pivots formed by the bolts 21, through the medium of a connection 26 between the lever and the blade as shown. It is of course to be understood that the arms 16 are moved outwardly to disengage the blocks 22 from beside the end portions 18 when it is desired to raise the blade.

The blade 19 is formed with a flat bottom face 27 and its upper face is beveled downwardly at its forward edge as shown at 28, thus providing a self sharpening blade inasmuch as the dirt and stones passing under the blade tend to wear the forward bottom edge and thus the cutting operation is greatly facilitated.

When the device is in use, it is drawn across a field and the blade is adjusted beneath the runners so that the dirt is raised over the knife and the weeds are cut close to the ground, thereby leaving the soil in a pulverized and broken up condition much desired by orchardists.

A particular advantage of the device over other weeders is that it cuts off all the weeds regardless of size and number by a single operation and also leaves the ground in a cultivated smooth condition and obviates further cultivation.

What is claimed is:—

1. A weeder comprising a sled-like frame, arms projecting rearwardly from the frame and a knife blade having its end portions pivotally and vertically adjustable upon the arms.

2. A weeder comprising a sled having spaced longitudinal runner bars, draft means at the forward ends of the bars, arms secured to the rear ends of the bars and projecting rearwardly therefrom, a cutting member having a beveled forward edge and upwardly extended ends, means connecting said ends and the arms for vertical adjustment, means carried by the arms for limiting the rearward pivotal movement of the cutting member and means for raising the cutting member when the last named means are in operation.

3. A weeder comprising a sled frame having runner bars, arms carried by the rear ends of the runner bars and formed of strap iron with their rear ends twisted in a vertical plane, a cutter blade having a flat bottom face and a downwardly beveled forward edge, the ends of the cutter blade being upwardly directed and provided with a series of perforations, means connecting said ends with the arms for vertical adjustment and blocks carried by the arms and adapted to be adjusted to hold said ends to vary the angle of slant of the cutter blade.

In testimony whereof, I affix my signature, in presence of two witnesses.

ROMAINE OWEN, Jr.

Witnesses:
 A. M. Mikel,
 A. Andersen.

---

Copies of this patent may be obtained for five cents each, by addressing the "Commissioner of Patents. Washington, D. C."